(12) United States Patent
Viswambharan et al.

(10) Patent No.: US 12,531,891 B2
(45) Date of Patent: Jan. 20, 2026

(54) DYNAMIC POLICY ENFORCEMENT FOR CLOUD-BASED APPLICATIONS IN AN ENTERPRISE ENVIRONMENT

(71) Applicant: Cisco Technology, Inc., San Jose, CA (US)

(72) Inventors: Rajesh Indira Viswambharan, Karnataka (IN); Poojalakshmi D, Mangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 252 days.

(21) Appl. No.: 18/446,053

(22) Filed: Aug. 8, 2023

(65) Prior Publication Data

US 2025/0055870 A1  Feb. 13, 2025

(51) Int. Cl.
*H04L 9/40* (2022.01)

(52) U.S. Cl.
CPC ........ *H04L 63/1433* (2013.01); *H04L 63/105* (2013.01); *H04L 63/20* (2013.01)

(58) Field of Classification Search
CPC ... H04L 63/1433; H04L 63/105; H04L 63/20; H04L 63/08
USPC ............................................................ 726/1
See application file for complete search history.

(56) References Cited

U.S. PATENT DOCUMENTS

| | | | |
|---|---|---|---|
| 9,591,016 B1 * | 3/2017 | Palmieri | H04L 63/1433 |
| 11,870,767 B1 * | 1/2024 | Natarajan | H04L 47/70 |
| 2016/0232358 A1 * | 8/2016 | Grieco | G06F 21/577 |
| 2016/0315965 A1 | 10/2016 | Sastry et al. | |
| 2017/0111383 A1 * | 4/2017 | Most | H04L 63/1416 |
| 2017/0295181 A1 | 10/2017 | Parimi et al. | |
| 2018/0239903 A1 * | 8/2018 | Bodin | G06F 21/577 |
| 2022/0215100 A1 * | 7/2022 | Waplington | G06F 21/577 |
| 2022/0360602 A1 | 11/2022 | Rose | |

(Continued)

OTHER PUBLICATIONS

Cisco, "Cisco Secure Workload Protection Data Sheet," https://www.cisco.com/c/en/us/products/collateral/data-center-analytics/tetration-analytics/datasheet-c78-740328.html, Jan. 28, 2021, 14 pages.

(Continued)

*Primary Examiner* — Aubrey H Wyszynski
(74) *Attorney, Agent, or Firm* — Edell, Shapiro & Finnan, LLC

(57) ABSTRACT

Provided herein are techniques to facilitate dynamic policy enforcement for cloud-based applications in an enterprise environment. In one example, a method may include obtaining, from a cloud network of a cloud-based application, an authentication request associated with an enterprise user that is seeking to utilize the cloud-based application, wherein the authentication request comprises an application identifier and a vulnerability index associated with the cloud-based application; identifying one or more vulnerabilities of the cloud-based application based on the application identifier and the vulnerability index; determining an access level for which the cloud-based application is allowed to access the enterprise network based, at least in part, on one or more vulnerabilities of the cloud-based application and one or more access rules associated with the cloud-based application; and sending a response to the cloud network indicating the access level for which the cloud-based application is allowed to access the enterprise network.

20 Claims, 6 Drawing Sheets

(56) References Cited

U.S. PATENT DOCUMENTS

2023/0004445 A1    1/2023   Bosch et al.
2023/0247003 A1*   8/2023   Chanak ................ H04L 9/3226
                                                      726/1

OTHER PUBLICATIONS

Wikipedia, "Attribute-based access control," retrieved from https://en.wikipedia.org/wiki/Attribute-based_access_control, Jul. 12, 2023, 6 pages.

Cisa, "Vulnerability Exploitability exchange (VEX)—Use Cases," https://www.cisa.gov/ . . . /EX_Use_Cases_April2022.pdf, Apr. 2022, 11 pages.

Wikipedia, "Software supply chain," retrieved from https://en.wikipedia.org/wiki/Software_supply_chain, Jul. 13, 2023, 3 pages.

Nita, "Framing Software Component Transparency: Establishing a Common Software Bill of Materials (SBOM)," NTIA Multistakeholder Process on Software Component Transparency Framing Working Group, Second Edition, Oct. 21, 2021, 34 pages.

Torkura, K., et al., "SlingShot—Automated Threat Detection and Incident Response in Multi Cloud Storage Systems," Hasso-Plattner-Institute for Digital Engineering, University of Potsdam, retrieved from https://www.researchgate.net/publication/335921611_SlingShot_Automated_Threat_Detection_and_Incident_Response_in_Multi_Cloud_Storage_Systems, Jul. 19, 2023, 5 pages.

Kilonzi, F., "Vulnerability Management Strategies for the Cloud," The New Stack, https://thenewstack.io/vulnerability-management-strategies-for-the-cloud/, Oct. 26, 2022, 9 pages.

* cited by examiner

DYNAMIC POLICY ENFORCEMENT FOR CLOUD-BASED APPLICATIONS IN AN ENTERPRISE ENVIRONMENT

TECHNICAL FIELD

The present disclosure relates to network equipment and services.

BACKGROUND

Networking architectures have grown increasingly complex in communication environments. In some instances, applications can be hosted in a cloud network. There are many security concerns regarding operation of cloud-based applications by enterprises and, thus, opportunities exist to improve the security of cloud-based applications utilized by an enterprise.

DETAILED DESCRIPTION

Overview

Figure 1:
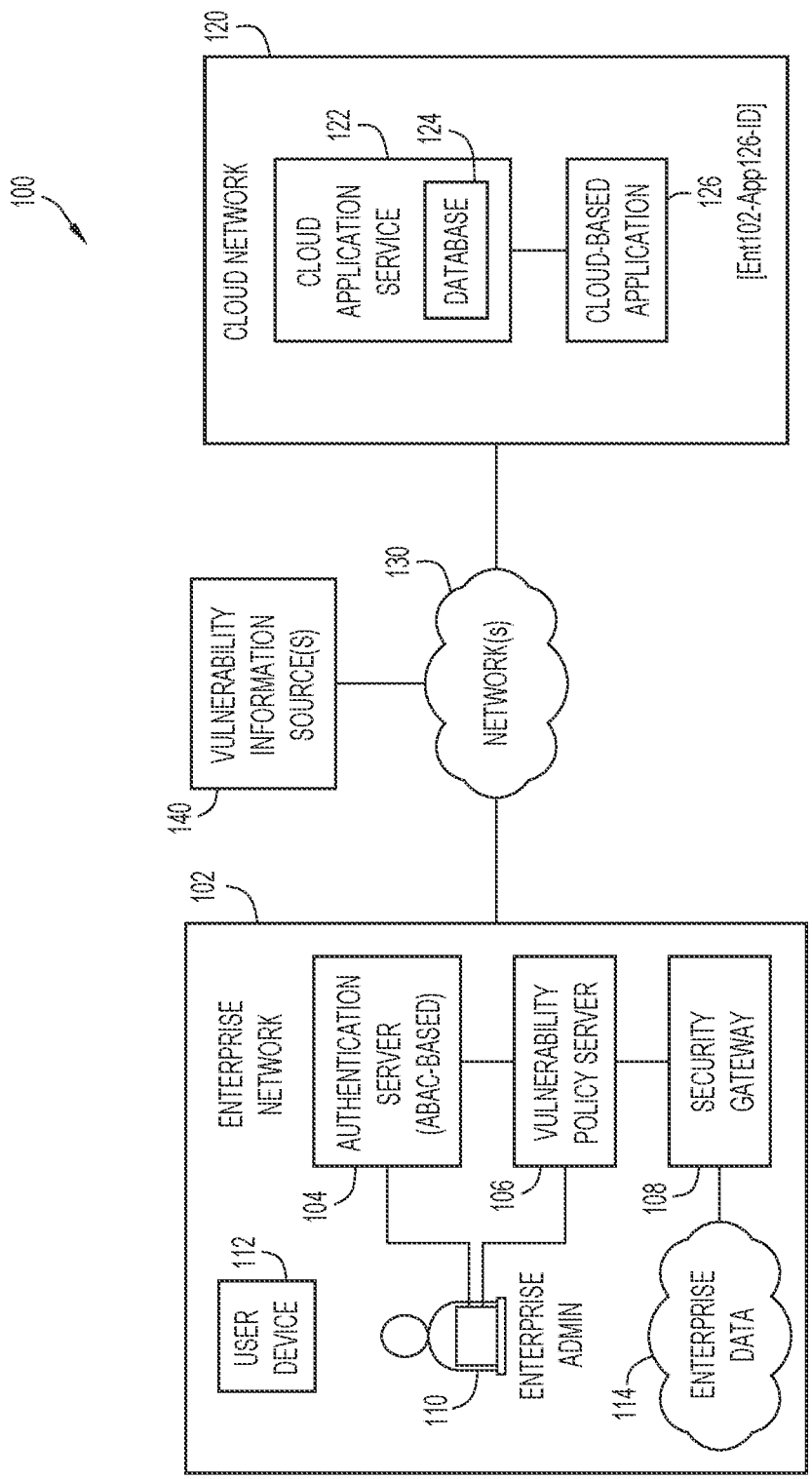
FIG. 1 is a block diagram of a system that may be provided to facilitate dynamic policy enforcement for cloud-based applications in an enterprise environment, according to an example embodiment.

In at least one embodiment, a computer-implemented method is provided that may include providing dynamic policy enforcement for cloud-based applications in an enterprise environment. For example, in at least one embodiment, a computer-implemented method is provided that may include obtaining, from a cloud network of a cloud-based application, an authentication request associated with an enterprise user that is seeking to utilize the cloud-based application, wherein the authentication request comprises an application identifier and a vulnerability index associated with the cloud-based application; identifying one or more vulnerabilities of the cloud-based application based on the application identifier and the vulnerability index; determining an access level for which the cloud-based application is allowed to access the enterprise network based, at least in part, on one or more vulnerabilities of the cloud-based application and one or more access rules associated with the cloud-based application; and sending a response to the cloud network indicating the access level for which the cloud-based application is allowed to access the enterprise network.

EXAMPLE EMBODIMENTS

A modern trend in application development involves leveraging a cloud infrastructure (e.g., Software-as-a-Service (SAAS), Platform-as-a-Service (PAAS), etc.) in combination with low-code/no-code platforms in order to provide cloud-based applications that can be utilized by enterprise users/devices of an enterprise network. Such applications cab often access sensitive corporate data and pass it to different application, dependency chains, etc. that may be external to an enterprise network (e.g., in the cloud). Many enterprises leverage private and public cloud infrastructures both as producers and consumers of cloud-based applications.

Thus, one concern with utilization of cloud-based applications and the potential exposure of sensitive enterprise and/or user data to the cloud, involves the detection of new vulnerabilities or threats for a software stack for an application and the potential exploitation of such vulnerabilities.

In conventional vulnerability detection systems, the software bill of materials (SBOM) standard supports a companion document, referred to as a Vulnerability Exploitability Exchange (VEX) document, that can be used to exchange vulnerability information with application consumers. Generally, SBOM documents are machine-readable documents, files, or data structures that identify or otherwise provide an inventory of components, functions, libraries, etc. that may be utilized by software/applications. In some instances, SBOMs can identify vulnerabilities of elements identified in an SBOM. Generally, VEX documents are machine-readable SBOM companion documents, files, or data structures that can provide more detailed vulnerability information for various software/applications/etc. Thus, SBOM and VEX documents can be ingested and utilized by security management tools, software, logic, etc. in order to identify/manage vulnerabilities for software/applications/etc.

Additionally, cloud providers have taken stringent measures to detect and protect various vulnerability threats by subscribing to feeds from various vulnerability detection sources, such as the Common Vulnerabilities and Exposures (CVE®) database and other security vendor databases. CVE® is a registered trademark of The MITRE Corporation.

However, there are some limitations with regard to managing potential vulnerabilities for enterprise environments/networks. For example, enterprises that consume cloud-based applications need to participate in vulnerability management processes in a coordinated manner with a cloud provider. Many times, however, cloud providers make decisions to act upon vulnerabilities on behalf of applications rather than on behalf of tenants/consumers (e.g., enterprises utilizing the applications) without making informed decisions, which can lead to false positives and operational inconvenience for the tenants/consumers (enterprises).

Thus, it would be useful if policy enforcement processes were more customized with or to consider enterprise policies, for example, potentially based on the criticality of an application, location and time of access, role of an enterprise user attempting to access an application, sensitivity of data that an application is to access, etc.

Though the SBOM standard helps to capture vulnerability information and to dynamically update VEX documents, there is no standard mechanism established regarding how such data may be dynamically ingested/consumed at a consumer level (e.g., by an enterprise). For example, a VEX document is a companion document that a consumer has to actively seek. Cloud providers can monitor the vulnerability/exposure data and update a VEX, but there is no standard mechanism through which consumers of applications to dynamically process such information in/for an application.

With low-code platforms, enterprises can subscribe to applications facilitated via platforms in the cloud, which can help enterprise users to quickly build/implement/utilize applications. Such cloud-based applications can represent an assortment of task units that can access corporate/enterprise data, critical application programming interfaces (APIs), and/or any other enterprise information, processes, etc. Thus, observability aspects are a constant concern for enterprises that utilize such applications. With more and more enterprise tasks utilizing such applications, the traceability of vulnerabilities in such applications, and considering this in accordance with enterprise data/processes that such applications may access for an enterprise, will continue to be a concern.

A cloud provider can capture SBOM and VEX information based on the software used for an application, but the cloud provider may not have control over what data the application accesses from the enterprise side, whereas the enterprise lacks dynamic updates on potential vulnerabilities being detected for such applications.

Thus, it would be advantageous to provide a more coordinated approach between cloud providers and enterprise consumers for enforcing access policies on detected vulnerabilities of applications in a more dynamic and timely manner.

Embodiments herein facilitate establishing an ability for an enterprise to interleave enterprise policies dynamically based on access restriction(s) of vulnerable applications in a more customized manner by facilitating coordination between an enterprise or, more specifically, an enterprise network (and nodes/elements thereof), and a cloud provider of a cloud-based application, which may also be referred to herein as a low-code application provided in a cloud network/infrastructure.

For example, as part of an initial authentication flow of a particular cloud-based/low-code application, an underlying digest/VEX report can be exchanged with an authentication server of the enterprise network that interacts with an enterprise policy server to determine whether one or more user(s) can access/utilize the particular cloud-based application and/or what operations may be performed by the particular cloud-based application. Through various operations as provided by embodiments herein, potential vulnerability aspects can be processed in conjunction with other dynamic parameters/operating information as configured/defined by an enterprise that may be associated with a cloud-based/low-code application, such as the sensitivity of data that is to be accessed by the application and/or any other parameters/operating information associated with the application, by considering such different dynamic parameters as part of the authentication flow in determining whether one or more enterprise user(s) can utilize the application.

Referring to FIG. 1, FIG. 1 is a block diagram of a system 100 that may be provided to facilitate dynamic policy enforcement for cloud-based applications in an enterprise environment, according to an example embodiment. In at least one embodiment, system 100 may include an enterprise network 102 and a cloud network, platform, or infrastructure, shown in FIG. 1 as cloud network 120, and any number of vulnerability information source(s) 140 in which the enterprise network 102, the cloud network 120, and the vulnerability information source(s) 140 may be interconnected and/or otherwise interface via one or more network(s) 130.

Enterprise network 102 may be implemented as any combination of wired network(s) (e.g., local and/or wide-area) and/or wireless network(s) (e.g., local and/or wide-area) that may be owned, managed, and/or otherwise operated by an enterprise entity (e.g., a business entity, government entity, educational entity, etc.), also referred to herein interchangeably as an 'enterprise', 'enterprise consumer', 'consumer' and/or any variations thereof, in which the enterprise network 102 may include an authentication server 104, a vulnerability policy server 106, a security gateway 108, and one or more enterprise client or user devices, such as a user device 112 that can be operated by an enterprise user. Also shown in FIG. 1 is an enterprise administrator (admin), such as an enterprise admin 110, that may interact with the authentication server 104 and the vulnerability policy server 106 in order to facilitate various operations as discussed for embodiments herein. Various enterprise data that may be stored, accessed, managed, etc. for enterprise network 102 is generally illustrated in FIG. 1 as enterprise data 114.

Authentication server 104 may be implemented as an Attribute-Based-Access-Control (ABAC) server and may operate to perform various authentication or access control operations as discussed for embodiments herein. Generally, ABAC-based authentication/access control operations involve the use of attribute strings that can be provided/exchanged in order to facilitate an authentication/access control decision for an entity, or as discussed for embodiments herein, as related to access to an enterprise network involving a cloud-based application.

The vulnerability policy server 106 can be provided in the enterprise network 102 in order to capture application registration information captured/provided during application creation/initialization between the enterprise network and the cloud provider, along with access policy restrictions that are to be enforced on/for the application. In at least one embodiment, the vulnerability policy server can be implemented as an extension of the ABAC-based authentication server. Thus, although illustrated in FIG. 1 as separate elements of enterprise network 102, in at least one embodiment functionality for authentication server 104 and vulnerability policy server 106 can be provided/implemented via a single network element or a combination of network elements.

Thus, vulnerability policy server 106 may operate to store, manage, and/or obtain vulnerability information (e.g., SBOM documents, VEX documents, etc.) for one or more cloud-based applications, such as cloud-based application 126, that may be accessed or otherwise utilized by one or more enterprise users/user devices, such as user device 112. Vulnerability policy server 106 may also operate store, manage, and/or managing, and/or obtain access policies that may include dynamic attributes/parameters or, more generally, access rules, that can be utilized to analyze vulnerability information for cloud-based applications in relation to the access policies in order to identify a level of access to enterprise network 102 that may be allowed for one or more cloud-based applications, such as cloud-based application 126, utilized by one or more enterprise users/user devices, such as user device 112.

An enterprise administrator can create different sets of vulnerability handling policies and/or access policies/rules in the policy server based on various considerations including, but not limited to, the criticality of an application, location and time of access, user role, sensitivity of data that is to be accessed by an application, as well as the consideration of the vulnerability feeds/information or, more specifically, one or more detected vulnerabilities for a cloud-based application that the vulnerability policy server 106 may obtain/receive from the cloud provider and/or vulnerability information source(s). In at least one embodiment, the access policy rules can be altered dynamically.

In at least one embodiment, security gateway 108 may be implemented as any combination of an Application Programming Interface (API) gateway/server, a firewall gateway/server, etc., potentially inclusive of any number/combination of security gateways that may operate to manage interactions, access, and/or any other operations through which one or more applications external to enterprise network 102, such as application 126 may access/utilize enterprise data 114.

Cloud network 120 may be implemented as any combination of wired network(s) (e.g., local and/or wide-area) and/or wireless network(s) (e.g., local and/or wide-area) that may be owned, managed, and/or otherwise operated by a cloud/cloud application provider, in which cloud network 120 may include a cloud application service 122 that may facilitate/manage one or more applications that can be provided for cloud network 120, such as a cloud-based application 126, as shown in FIG. 1. In some instances, cloud application service 122 may provide a portal or other user interface, etc. through which one or more enterprise users/admins/etc. can create, configure, and/or otherwise initialize a new cloud-based application, such as cloud-based application 126, that is to be utilized by one or more enterprise users/user devices of enterprise network. In some instances, cloud-based application 126 can be implemented as a low-code application.

Cloud application service 122 may also manage/maintain a database 124 in which various information related to cloud-based application 126 may be stored, as discussed for various embodiments herein. Additionally, any other operating information, policy information, etc. may be stored via database 124 in order to facilitate various embodiments herein. In various embodiments, information stored via database 124 for a given cloud-based application may include, but not be limited to application information (e.g., version information, identifying information, etc.), software/software functions/function calls/etc., vulnerability information/data (e.g., SBOM document(s), VEX document(s), etc.), combinations thereof, and/or any other information/data that may be relevant/utilized for operation of a cloud-based application provided via cloud-application service.

Vulnerability information source(s) 140 may be considered any combination of vulnerability databases (e.g., the CVE® database, etc.), data stores, vulnerability information feeds, and/or any other external source of vulnerability information that may be accessed and/or otherwise receive vulnerability information for one or more cloud-based applications, such as cloud-based application 126.

The network(s) 130 may be implemented as any combination of as any combination of wired network(s) (e.g., local and/or wide-area) and/or wireless network(s) (e.g., local and/or wide-area) that may facilitate interconnection, interfacing, communications, etc. among one or more elements of enterprise network 102, cloud network 120, and vulnerability information source(s).

Broadly during operation of system 100, embodiments herein provide for establishing the ability for an enterprise operating an enterprise network, such as enterprise network 102, to interleave enterprise policies dynamically via access restriction(s) of vulnerable applications in a customized/customizable manner facilitating by vulnerability coordination and authentication/access operations with a cloud provider of one or more cloud-based applications, such as with cloud application service 122 and cloud-based application 126 of cloud network 120.

The cloud application service 122 can generate/assign a unique application identifier (ID), referred to herein as 'AppID', for each application that is to be utilized by each of one or more tenants, such as the enterprise network 102, such as a unique ID for cloud-based application 126, shown in FIG. 1 as 'Ent102-App126-ID' that is specific to the enterprise operating enterprise network 102 for cloud-based application 126 can be stored in database 124 for the cloud-based application 126, as maintained by cloud application service 122. Cloud applications facilitated by a cloud provider can be given unique IDs specific to each tenant (enterprise) that may utilize a particular cloud-based application. Such cloud provider generated application IDs can be useful to map an application to the software stack, or SBOM, utilized by the application, the sensitive data that may be accessed by the application, the APIs accessed by the application from the enterprise side, and/or the like. Further, the application ID may be useful for tracking different classes of cloud-based/low-code applications that may be created by enterprise users/user devices on low-code platforms that are otherwise difficult to track in conventional implementations.

In various embodiments, a cloud-based/low-code application provided for an enterprise by a cloud provider, such as cloud-based application 126, may be any application/function/etc. that may be utilized by an enterprise network, such as a video conferencing application, an email application, an audio/video streaming application, a data management application, a customer management application, a marketing application, combinations thereof, and/or any other cloud-based application that may be accessed/utilized by an enterprise network/enterprise users/user devices.

During operation of system 100, the enterprise network 102, via any combination of authentication server 104, vulnerability policy server 106, enterprise admin 110, and/or an enterprise user/user device 112 creating/initializing a cloud-based application provided via cloud network, can negotiate or otherwise provide a handling policy to the cloud network 120 or, more specifically, to cloud application service 122 regarding a level coordinated handling of detected vulnerabilities for cloud-based applications that is to be utilized for access control/authentication of enterprise users/user devices seeking to access/utilize cloud-based applications provided via cloud network 120, such as cloud-based application 126.

In some embodiments, a handling policy can be provided to cloud application service 122 such that the handling policy is to be utilized for all cloud-based applications provided via the cloud application service 122. However, in some embodiments, different handling policies can be provided to the cloud application service 122 for each of one or more different cloud-based applications that may be provided via the cloud application service 122. Thus, different handling policy variations may be provided by an enterprise. For example, some classes/types of applications may be provided one handling policy, while other classes/types of applications may be provided another handling policy, or any variation/extension thereof. One or more handling policies provided to cloud application service 122 by enterprise network 102 can be stored via database 124, potentially in combination with/mapped to AppIDs for one or more cloud-based applications provided via cloud application service 122 (e.g., for cloud-based application 126).

In various embodiments, different handling policies may include, but not be limited to a 'Cloud-Only' handling policy, a 'Coordinated-Static' handling policy, or a 'Coordinated-Dynamic' handling policy.

For the Cloud-Only handling policy, the enterprise network 102 gives full authentication authority to the cloud application service 122 in dealing with access restrictions (e.g., access to the enterprise network 102/enterprise data 114) for vulnerable applications.

For the Coordinated-Static handling policy, at the time of application creation/initialization, enterprise network 102 can specify that authentication for access restrictions is to be performed by the cloud application service 122 based on detected vulnerabilities for a cloud-based application, such as cloud-based application 126, in combination with one or more dynamic attributes/parameters, or more generally, access rules, suggested/provided by the enterprise network that the cloud application service is to consider at the time of enforcing the policy or, more specifically, at the time that an enterprise user/user device seeks to access/utilize the cloud-based application. In various embodiments, the access rules can include, but not be limited to, an identity/role of an enterprise user/user device seeking to utilize an application, criticality of the application, location and time of access, sensitivity of data to be accessed by the application, combinations thereof, and/or any other access rules that may be used to enforce access restrictions for an application having one or more detected vulnerabilities.

For the Coordinated-Dynamic handling policy, access control is to be given to the enterprise network 102 such that the authentication server 104 and vulnerability policy server 106 can enforce an access policy/access rules for a given cloud-based application, such as cloud-based application 126, for example, at the time that an enterprise user/user device seeks to access/utilize the cloud-based application. When the Coordinated-Dynamic handling policy is specified by the enterprise network 102 for a given cloud-based application, the cloud provider or, more specifically, the cloud application service 122 is to exchange/provide all intelligence/data (e.g., vulnerability digest/information or indications thereof) to the authentication server 104 as part of an initial authentication involving an enterprise user/user device that seeks to access/utilize the cloud-based application. Thus, in at least one embodiment, the authentication server may be considered as an identity and access management server that the cloud network 102/cloud applications service can utilize for authentication of an enterprise user/user device that seeks to access/utilize cloud-based application(s) provided via cloud applications service, such as cloud-based application 126.

In at least one embodiment involving operations for the Coordinated-Dynamic handling policy, as part of the initial authentication flow for an enterprise user/user device, such as user device 112, seeking to access/utilize a cloud-based/low-code application provided via a cloud infrastructure, such as cloud-based application 126, an underlying vulnerability digest/VEX report, or, more generally, vulnerability information, can be exchanged with the authentication server 104. The authentication server 104 can further interact with the vulnerability policy server 106 to process vulnerability aspects of the application by considering one or more dynamic attributes/parameters (access rules) of an enterprise access policy regarding the application (e.g., the sensitivity of enterprise data that an application is to access, location and time of access, enterprise user information, etc.). The access policy rules can be dynamically updated at any time by an enterprise admin, such as enterprise admin 110 (e.g., as enterprise priorities, data, users, applications, etc. may change for enterprise network 102).

In one example, as part of an initial (e.g., contract communication/establishment) exchange between an enterprise vendor (tenant), such as enterprise network 102, and a cloud provider, such as cloud application service 122 of cloud network 120, the enterprise can expose a uniform resource locator (URL) to the cloud provider, such as 'App-Registration-URL' identifying vulnerability policy server 106 and/or a database/storage thereof. The URL can be invoked by the cloud application service 122 on creation/registration of cloud-based application 126 in order to exchange or otherwise provide metadata to vulnerability policy server 106 regarding the software information, version statistics, information, etc., along with initial vulnerability metrics/information for cloud-based application 126. In at least one embodiment, the initial vulnerability metrics/information could inclusive of the standard SBOM and VEX documents for the cloud-based application 126 (e.g., a CVE® SBOM/VEX document) and/or could include a custom captured digest for the cloud-based application.

Thus, once the initial infrastructure/information/policies are provided exchanged between the enterprise network 102 and the cloud network 120, the vulnerability policy server 106 can be provided visibility of cloud-based applications provided via cloud network 120, along with access policies/rules that can also be provided for vulnerability policy server 106 (e.g., by enterprise admin 110).

In accordance with embodiments herein, operations for a Coordinated-Dynamic handling policy may leverage an ABAC-based authentication process via authentication server 104 in which custom attribute(s), referred to herein as a 'vulnerability index', can be used to exchange a vulnerability digest/vulnerability information as part of an authentication process for an enterprise user/user device seeking to access a cloud-based application that has detected vulnerabilities, such as cloud-based application 126, potentially including one or more newly detected vulnerabilities (e.g., that the cloud application service 122 based on new vulnerability information obtained for the cloud-based application 126 from vulnerability information source(s) 140). In various embodiments, the vulnerability index may include a digest of the vulnerability information or a VEX document for an application.

The vulnerability index can be processed via the vulnerability policy server 106 in combination with vulnerability information (maintained and/or, potentially obtained by the vulnerability policy server 106) and access rules for an access policy regarding the cloud-based application 126 in order to determine an access decision regarding a level of access to enterprise network 102 (e.g., enterprise data 114) that can be accessed by the cloud-based application 126.

Thus, the runtime contract between enterprise network 102 and cloud network 120 may provide that, whenever an application, such as cloud-based application 126, is being accessed by an enterprise user/user device, as part of an initial authentication, if there is any detection of a new vulnerability, such information is to be provided/exchanged with the enterprise network 102 or, more specifically, with vulnerability policy server 106 through use of the vulnerability index that can be provided in the ABAC authentication flow involving authentication server 104.

In various embodiments, at least two flavors or variations of the vulnerability index may be utilized, such as an encoded attribute string or a vulnerability identifier (ID) as an attribute.

For embodiments in which the vulnerability index is implemented as an encoded attribute string, the vulnerability policy server 106 is configured to decipher the attribute string by decoding and identifying the composition of a vulnerability (or vulnerabilities) detected in the software stack of the cloud-based application 126. For example, an SBOM and/or a VEX document typically consists of software/product details, vulnerability details, status details, and/or the like, that can be indexed/identified in a manner such that the encoded string (vulnerability index) can be mapped to or otherwise correlated to vulnerability details contained in the SBOM/VEX documents and/or any other vulnerability digest/information previously provided to the vulnerability policy server 106 by cloud application service 122 during the creation/registration of the cloud-based application 126 (e.g., through use of the App-Registration-URL), as discussed above. Thus, one or more detected vulnerabilities for the cloud based application can be identified by mapping information contained in the encoded attribute string to various vulnerability details (e.g., software/product details, vulnerability details, status details, etc.) contained in an SBOM and/or VEX documents, and/or any other vulnerability digest/information stored by the vulnerability policy server. The one or more detected vulnerabilities can be analyzed in relation to access rules for an access policy regarding the cloud-based application 126 in order to determine an access decision regarding a level of access to enterprise network 102 (e.g., enterprise data 114) that is allowed for the cloud-based application 126.

For embodiments in which the vulnerability index is implemented as a vulnerability ID, the vulnerability ID may represent a unique identifier of the vulnerability detected for the cloud-based application 126 such that vulnerability policy server 106 can further query cloud application service 122 and/or an external vulnerability information source, such as one or more of vulnerability information source(s) 140 in order to obtain/retrieve/identify one or one or more detected vulnerabilities for the cloud-based application 126. The one or more detected vulnerabilities can be analyzed in relation to access rules for an access policy regarding the cloud-based application 126 in order to determine an access decision regarding an access level of enterprise network 102 (e.g., enterprise data 114) that is allowed for the cloud-based application 126.

Different access policy decisions or, more specifically, access levels, may be enforced for system 100 including, but not limited to, a 'Block-Fully' decision/access level, a 'Partial-Access' decision/access level, and a 'Full-Access' decision/access level.

In at least one embodiment, a Block-Fully access decision/level may provide for fully blocking a cloud-based application at the authentication level such that future requests from the cloud-based application (e.g., API calls, etc. for enterprise data 114 and/or other operations/interactions involving one or more network elements of enterprise network 102) cannot be entertained or otherwise processed by the enterprise API and/or resource servers, such as security gateway 108.

In at least one embodiment, a Partial-Access decision/access level may provide for selectively allowing certain operations (e.g., API calls, etc.) to be performed by a cloud-based application with the enterprise network 102. For example, in this scenario, when an API or other function call/request lands on (i.e., is received by) security gateway 108, the security gateway 108 will check with the vulnerability policy server with the AppID for the application to determine whether the call/request is to be honored or blocked. In some embodiments, an access policy can also facilitate access decisions that provide for rate limiting and time-bound access restrictions.

In at least one embodiment, a Full-Access decision/access level may allow a cloud-based application full-access to the enterprise network 102/enterprise data 114 upon determining that the vulnerability/vulnerabilities detected for the cloud-based application will not impact the application with regard to interactions with enterprise network 102.

Upon determining an access decision/level for a cloud-based application, the decision/access level can be provided to the authentication server 104, which can send the decision to the cloud application service 122 using an ABAC attribute string, which can store the decision/access level via database 124. In some embodiments, the decision/access level may also be sent to cloud-based application 126.

Figure 2A:
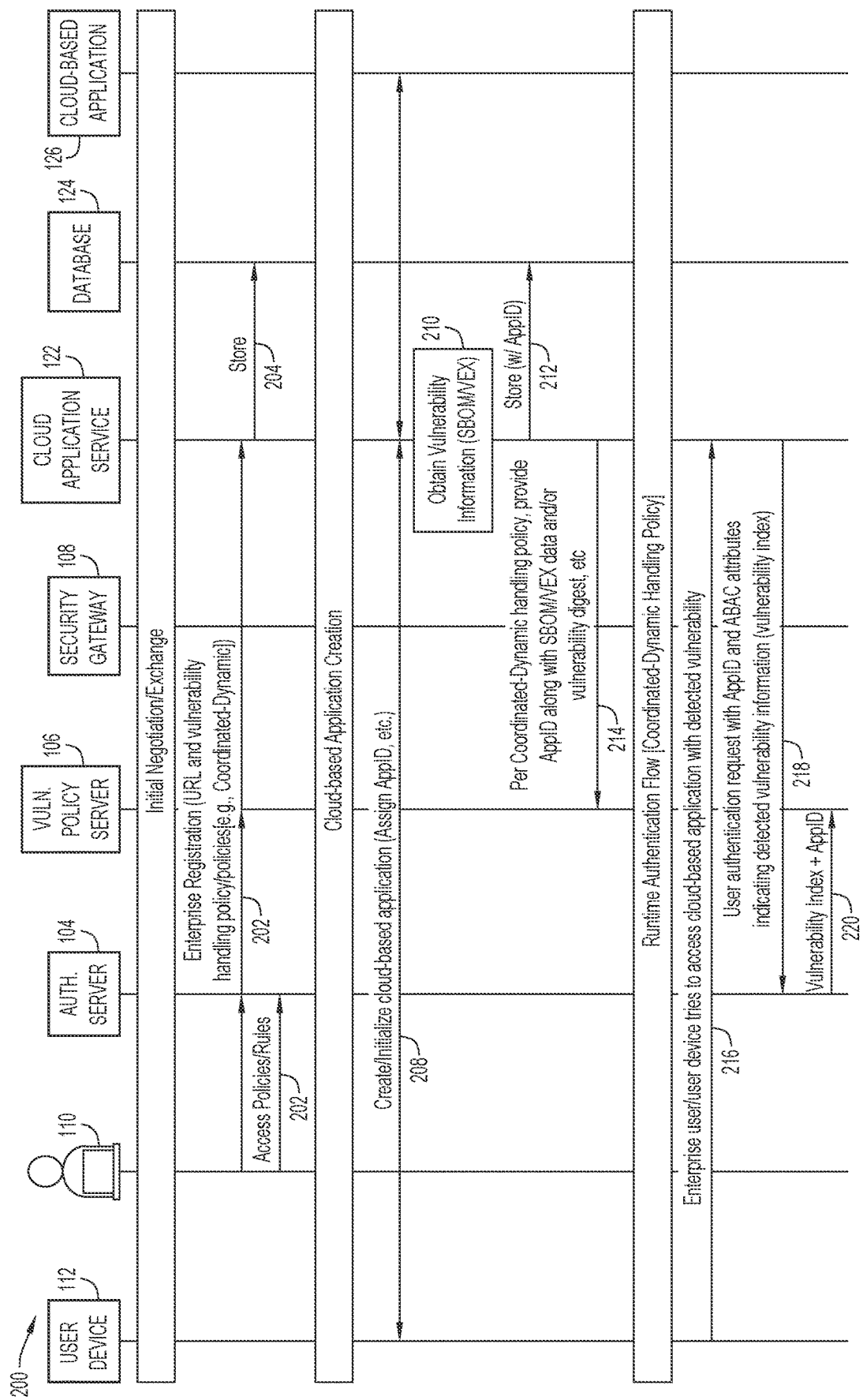
FIGS. 2A and 2B are a message sequence diagram illustrating various example operations that may be performed to facilitate dynamic policy enforcement for cloud-based applications, according to an example embodiment.
Figure 2B:
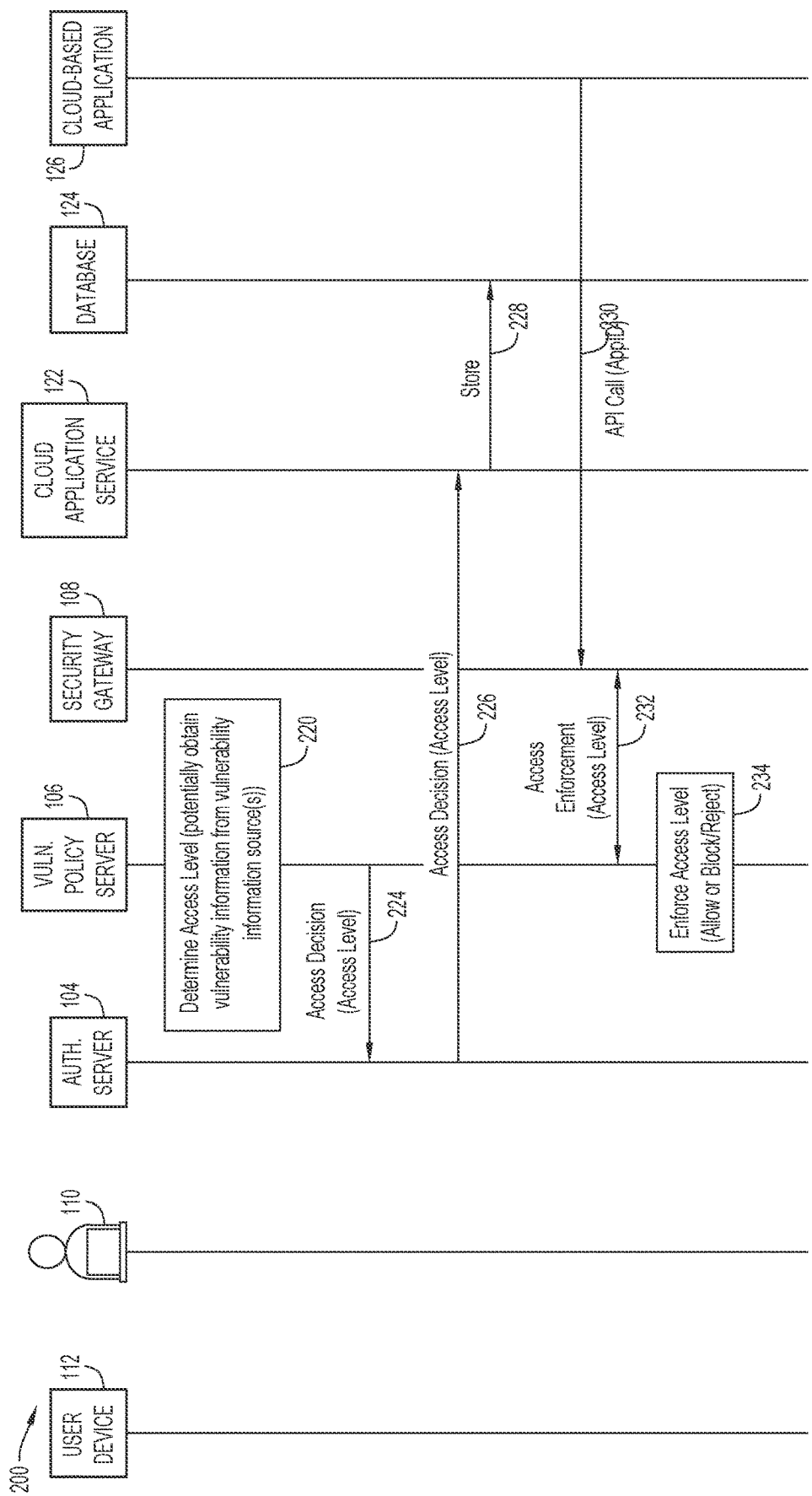

Consider an operational example for system 100 as discussed with reference to FIGS. 2A and 2B, which are a message sequence diagram 200 illustrating various example operations that may be performed to facilitate dynamic policy enforcement for cloud-based applications, according to an example embodiment. FIGS. 2A and 2B illustrate user device 112, enterprise admin 110, authentication server 104, vulnerability policy server 106, and security gateway 108 of enterprise network 102. FIGS. 2A and 2B also illustrate cloud application service 122, database 124, and cloud-based application 126 of cloud network 120. Vulnerability information source(s) 140 and enterprise data 114 are not shown in FIGS. 2A and 2B, but certain operations discussed with reference to FIGS. 2A and 2B may involve vulnerability information source(s) 140 and/or enterprise data 114 in accordance with various embodiments herein.

Various operations can be performed to facilitate dynamic policy enforcement for cloud-based applications via system 100. To begin, an initial negotiation/exchange can be performed between enterprise network 102 and cloud network 120, such as shown at 202 in FIG. 2A in which enterprise admin 110 can provide, via any combination of authentication server 104 and/or vulnerability policy server 106, enterprise registration information to cloud application service 122 including, but not limited to, a URL or other identifying information (e.g., a fully qualified domain name (FQDN), IP address, etc.) for vulnerability policy server 106 that cloud application service 122 can utilize in order to send vulnerability information (e.g., SBOM/VEX documents/data and/or any vulnerability digest/other vulnerability information) to the vulnerability policy server.

One or more vulnerability handling policies can also be provided to the cloud application service 122 at 202 (e.g., one handling policy to be utilized for all cloud-based applications provided by the cloud provider, different handling policies to be utilized for different applications, etc.). For the operational example of FIGS. 2A and 2B, consider that a Coordinated-Dynamic handling policy is set for the cloud application service 122 that is to be utilized for all applications provided via the service, such as cloud-based application 126.

As shown at 204, the information exchanged at 202 can be stored by cloud application service 122 via database 124. Further, as shown at 206, consider that enterprise admin 110 configures one or more access policies/rules for vulnerability policy server in which the access policies/rules can define various access levels that are to be utilized various cloud-based applications that may seek to access/interact with one or more network elements of enterprise network 102. In various embodiments, the various access policies/rules can include, but not be limited to, an identity/role of an enterprise user/user device seeking to utilize an application, criticality of the application, location and time of access, sensitivity of data to be accessed by the application, combinations thereof, and/or any other access rules that may be used to enforce access restrictions for an application having one or more detected vulnerabilities. The access policies/rules can be mapped to or otherwise correlated with different types/aspects of different vulnerabilities that may be identified for one or more cloud-based applications such that the vulnerability policy server 106 can determine an access level for a cloud-based application based on vulnerabilities identified for a cloud-based application in relation to such access policies/rules configured for the vulnerability policy server 106.

As shown at 208, consider that an enterprise user, via user device 112, seeks to create or otherwise initialize a cloud-based application, such as cloud-based application 126, via cloud application service 122 through which cloud application service 122 assigns an AppID to the cloud-based application 26 to be utilized by the enterprise network 102 (e.g., 'Ent102-App126-ID'). The AppID can be sent to cloud-based application 126 to be utilized for any API/function calls that may be initiated by the cloud-based application 126 towards enterprise network 102. Any other features, information, etc. related to cloud-based application 126 can be generated, configured, etc. via operations 208.

As shown at 210, consider that cloud application service 122 obtains vulnerability information, such as SBOM and VEX documents and/or any other vulnerability information/digests, etc. for cloud-based application 126 from one or more vulnerability information source(s) 140. The cloud application service 122 can store the AppID and the vulnerability information via database 124, as shown at 212. Further, per the Coordinated-Dynamic handling policy as configured by the enterprise at 202 for the present example, cloud application service 122 can also provide the AppID and the vulnerability information (e.g., SBOM/VEX documents/data and/or a vulnerability digest/other vulnerability information) for the cloud-based application 126 to vulnerability policy server 106.

As shown in FIG. 2A, consider a runtime authentication flow that may be performed in accordance with the Coordinated-Dynamic handling policy provided for cloud application service 122 in accordance with various embodiments herein. For example, as shown at 216, consider that an enterprise user, via user device 112, seeks to access/utilize the cloud-based application 126. For the present example, consider that one or more new vulnerabilities are detected for the cloud-based application in which cloud application service has learned of or otherwise obtained information regarding the detected vulnerabilities (e.g., via updated SBOM/VEX documents, etc.)

Upon obtaining the request from the user device 112, cloud application service 122, based on the configured Coordinated-Dynamic handling policy, initiates an authentication request towards/with the authentication server 104, as shown at 218. The authentication request sent to the authentication server 104 at 218 includes the AppID for cloud-based application 126 and ABAC attribute(s) that capture/indicate detected vulnerabilities/vulnerability information to the authentication service, such as the vulnerability index, as discussed above.

The vulnerability index can be provided via the ABAC custom attributes such that vulnerability index may include freshly composed data provided during access based on the software dependency chain (SBOM and VEX) of the underlying cloud-based application 126.

The authentication server 104 can retrieve the AppID and vulnerability index from the exchanged ABAC authentication request and, as shown at 220, sends the information to the vulnerability policy server 106. In some embodiments, the signaling at 220 may be a query including the AppID and vulnerability index in order to obtain an access decision from the vulnerability policy server 106 that identifies an access level for which the application is permitted regarding the enterprise network 102 and/or enterprise data 114 stored therein. As discussed above, in some embodiments, the vulnerability index may be an encoded attribute string that the vulnerability policy server can decipher the encoded attribute string and identify the composition of a detected vulnerability (or vulnerabilities) in relation to the vulnerability information either previously received from the cloud application service 122 (e.g., at 214) and/or vulnerability information that may be obtained from vulnerability information source(s). For example, the encoded attribute(s) of the vulnerability index can be mapped to different vulnerability data/details identified via SBOM/VEX documents or other vulnerability digest information (e.g., (e.g., software/product details, vulnerability details, status details, etc.). In some embodiments, as discussed above, the vulnerability index can be a self-encoded attribute of an vulnerability identifier (ID) that the vulnerability policy server 106 can utilize in order to further query to the cloud application service 122 and/or vulnerability information source(s) 140 using the vulnerability ID and potentially the AppID (e.g., if querying the cloud application service 122) in order to determine one or more detected vulnerabilities for the cloud-based application 126. In some embodiments, the vulnerability identifier may be an identifier of SBOM/VEX document(s), vulnerability digest(s), etc. that can be used to query the cloud application service 122 and/or vulnerability information source(s) 140 to obtain such vulnerability information. In some embodiments, the vulnerability identifier may be an identifier of such documents embedded within a URL, etc. that can be used to perform the query for such information.

Continuing to FIG. 2B as shown at 222, the vulnerability policy server 106 processes the vulnerability data for the one or more detected vulnerabilities and identifies an access policy or, more specifically, an access level, that is to be enforced on the authentication request for the cloud-based application 126. The access decision/level determined at 222 for the cloud-based application 126 can depend on the type of vulnerability/vulnerabilities identified for the cloud-based application (e.g., shared/identified through a SBOM/VEX document, etc.), the criticality of the application, the time and location of access, the sensitivity of the data that the application processes, and/or any other parameters/access rules as may be configured for one or more access policies provided for the vulnerability policy server 106. As shown at 224, the access decision including/identifying the determined access level is sent to authentication server 104, which can send the decision/access level to cloud application service 122 via an ABAC attribute string, as shown at 226 and stored via database 124, as shown at 228.

As discussed above, an access policy decision regarding an access level to be enforced for the cloud-based application 126 can include a 'Block-Fully' decision/access level, a 'Partial-Access' decision/access level, and a 'Full-Access' decision/access level. For the present operational example, consider that a 'Partial-Access' access level is determined for cloud-based application 126 based on the one or more vulnerabilities identified for the cloud-based application and the access policy/rules configured for vulnerability policy server 106.

For such a 'Partial-Access' access level determination involving cloud-based application 126, consider in one example, as shown in FIG. 2B, that cloud-based application 126 initiates an API call towards the enterprise network 102/security gateway 108 including the AppID, as shown at 230. Upon receiving the API call, security gateway 108 can query vulnerability policy server 106 to determine the access level to be enforced for the cloud-based application, as shown at 232.

As an illustrative example of such 'Partial-Access', consider a scenario in which an enterprise user creates a cloud-based application based on a low-code platform. The composition of the application may use different third-party libraries. Whenever any vulnerability is detected in any of the software used in the application, the application may be vulnerable to attack. The vulnerabilities can include software errors, script injection possibilities, opened ports, etc. Thus, when this application (which as detected vulnerabilities) accesses enterprise data, it could pose a threat to the enterprise network/enterprise data. Therefore, if the enterprise or, stated differently, the vulnerability policy server 106, knows that the vulnerable application accesses different data sources from the enterprise, then one or more access policies configured for the vulnerability policy server 106 can be used detect that certain resources can be allowed and certain resources need to be blocked for the vulnerable application, such that a 'Partial-Access' access level can be enforced for the application.

In some embodiments, the exchange with vulnerability policy server 106 at 232 may involve the vulnerability policy server 106 providing a simple 'allow' indication (e.g., for a 'Full-Access' access level determined for the cloud-based application 126 or based on a determination that a particular API call is allowed for a 'Partial-Access' access level determined for the cloud-based application 126) or a 'reject' indication (e.g., for a 'Block-Fully' access level determined for the cloud-based application 126 or based on a determination that a particular API call is not allowed for a 'Partial-Access' access level determined for the cloud-based application 126) to the security gateway 108 such that the security gateway can enforce the access level determination for the cloud-based application, as generally shown at 234.

In some embodiments, the exchange with vulnerability policy server 106 at 232 may involve the vulnerability policy server 106 providing a list of API calls that are to be rejected and/or that are to be allowed/blocked by the security gateway 108 for a 'Partial-Access' access level determined for the cloud-based application 126 such that the security gateway 108 can evaluate the API call in relation to the access level information received from the vulnerability policy server 106

In some embodiments, say for example, if the API call at 230 is a first API call involving the cloud-based application 126, the exchange with vulnerability policy server 106 at 232 may involve the vulnerability policy server 106 providing an indication to the security gateway 108 indicating that the security gateway is to enforce a particular access level for any subsequent API calls received from the cloud-based application 126 such that subsequent API calls received from the cloud-based application 126 may be evaluated by the security gateway 108 without further querying the vulnerability policy server 106 regarding an access level to be enforced. In some embodiments, such an indication regarding subsequent queries may be provided in combination with temporal information, location information, user information, combinations thereof, and/or the like such that upon satisfying condition(s) associated with such information (e.g., 24 hours has elapsed, the API call originated from a new location associated with the cloud-based application 126), the security gateway 108 may be triggered to perform a new query with vulnerability policy server 106 to determine a (potentially updated) access level to be enforced for the cloud-based application 126.

Accordingly, embodiments herein may provide flexibility for dynamically enforcing coordinated policies on cloud-based applications between an enterprise and cloud server by considering multiple aspects of an enterprise, potential application vulnerabilities, data to be accessed by an application, enterprise user roles, and/or any other parameters that may be important to an enterprise. Thus, embodiments herein may provide a solution for addressing observability challenges with cloud-based applications, particularly low-code applications that may be created by enterprise users via low-code platforms provided in the cloud.

Figure 3:
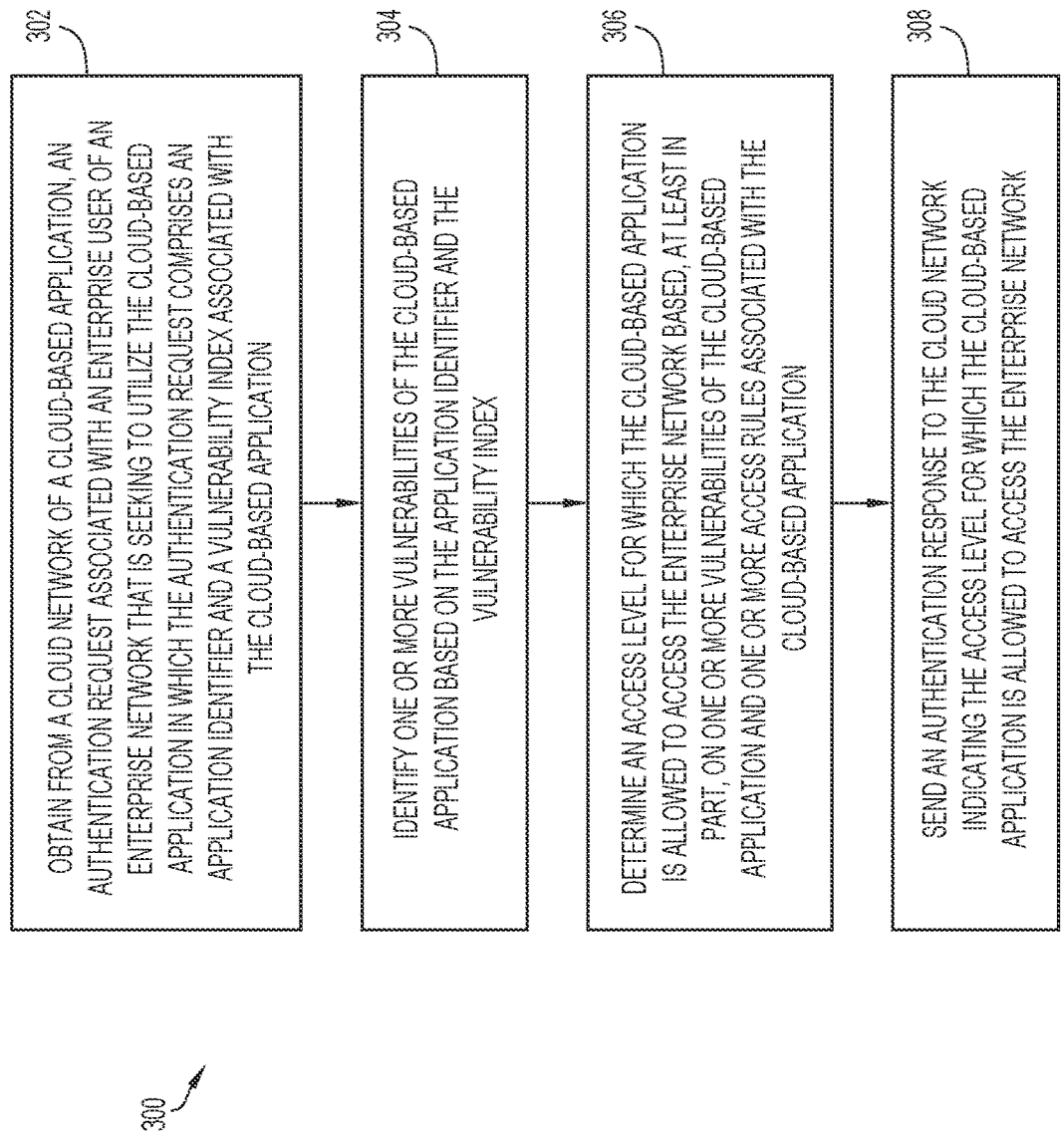
FIG. 3 is a flow chart depicting a method according to an example embodiment.

Referring to FIG. 3. FIG. 3 is a flow chart depicting a method 300 according to an example embodiment. In at least one embodiment, method 300 may be associated with operations that may be utilized to facilitate dynamic policy enforcement for cloud-based applications in an enterprise environment, such as shown in system 100, according to an example embodiment. In at least one embodiment, method 300 may be performed via an enterprise network or, more specifically, via any combination of an authentication server, such as authentication server 104, and a vulnerability policy server, such as vulnerability policy server 106 as shown in FIGS. 1, 2A, and 2B.

At 302, the method may include obtaining (e.g., by authentication server 104), from a cloud network of a cloud-based application, an authentication request associated with an enterprise user of an enterprise network that is seeking to utilize the cloud-based application in which the authentication request comprises an application identifier and a vulnerability index associated with the cloud-based application.

At 304, the method may include identifying (e.g., by vulnerability policy server 106) one or more vulnerabilities of the cloud-based application based on the application identifier and the vulnerability index. In at least one embodiment, the vulnerability index may be an encoded attribute string, and the identifying includes identifying, based on the application identifier and the encoded attribute string, the one or more vulnerabilities from vulnerability information for the cloud-based application stored by the enterprise network (e.g., stored by vulnerability policy server 106). In at least one embodiment, the vulnerability index may be a vulnerability identifier, and the identifying includes: querying at least one of the cloud network or one or more vulnerability information sources using, at least in part, the vulnerability identifier (and potentially the AppID, if querying cloud application service 122); and obtaining the one or more vulnerabilities based on the query.

At 306, the method may include determining (e.g., by vulnerability policy server 106) an access level for which the cloud-based application is allowed to access the enterprise network based, at least in part, on one or more vulnerabilities of the cloud-based application and one or more access rules associated with the cloud-based application. In various embodiments, the access level may indicate one of: that all data requests sent from the cloud-based application to the enterprise network are to be blocked from accessing enterprise data for the enterprise network enterprise network (e.g., a 'Block-Fully' access level), that one or more types of requests sent from the cloud-based application are allowed to access enterprise data for the enterprise network (e.g., a 'Partial-Access' access level), or that all requests sent from the cloud-based application are allowed to access enterprise data for the enterprise network (e.g., a 'Full-Access' access level).

At 308, the method may include sending (e.g., by authentication server 104) an authentication response to the cloud network indicating the access level for which the cloud-based application is allowed to access the enterprise network. The access level can be indicated in the response via an ABAC attribute string. Although not shown in FIG. 3, the method may further include enforcing one or more function calls of the cloud-based application received by the enterprise network based on the determined access level (e.g., as shown at 232 of FIG. 2B).

Figure 4:
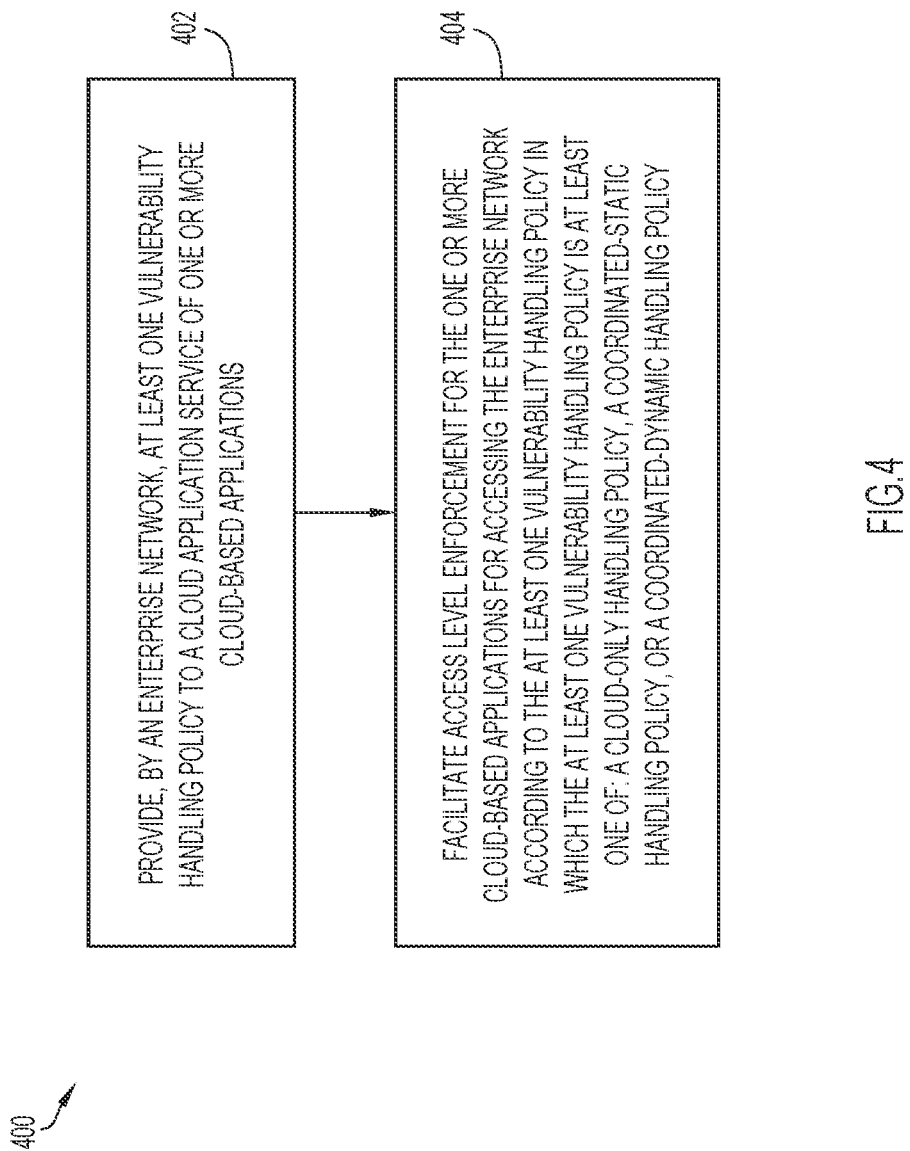
FIG. 4 is a flow chart depicting another method according to an example embodiment.

Referring to FIG. 4, FIG. 4 is a flow chart depicting a method 400 according to an example embodiment. In at least one embodiment, method 400 may be associated with operations that may be utilized to facilitate dynamic policy enforcement for cloud-based applications in an enterprise environment, such as shown in system 100, according to an example embodiment. In at least one embodiment, method 400 may be performed via an enterprise network or, more specifically, via any combination of an authentication server, such as authentication server 104, and a vulnerability policy server, such as vulnerability policy server 106 and, in some instances, a cloud network or, more specifically, a cloud application service, such as cloud application service 122, as shown in FIGS. 1, 2A, and 2B.

At 402, the method may include providing, by an enterprise network (e.g., an enterprise authentication server or a vulnerability policy server of the enterprise network), at least one vulnerability handling policy to a cloud application service of one or more cloud-based applications.

At 404, the method may include facilitating access level enforcement for the one or more cloud-based applications for accessing the enterprise network (e.g., with regard to accessing enterprise data, network elements, etc. of the enterprise network), according to the at least one vulnerability handling policy in which the at least one vulnerability handling policy is at least one of: a Cloud-Only handling policy, a Coordinated-Static handling policy, or a Coordinated-Dynamic handling policy.

In one instance, the Cloud-Only handling policy indicates that the cloud application service has authority to determine and/or enforce an access level for accessing the enterprise network for one or more vulnerabilities of the one or more cloud-based applications. In one instance, the Coordinated-Static handling policy indicates that the cloud application service has authority to determine and/or enforce an access level for accessing the enterprise network for one or more vulnerabilities of the one or more cloud-based applications based on one or more parameters or access rules provided to the cloud application service by the enterprise network (e.g., the enterprise authentication server and/or the vulnerability policy server). In one instance, the Coordinated-Dynamic handling policy indicates that the enterprise network (e.g., the authentication server and the vulnerability policy server) have authority to determine and/or enforce an access level for accessing the enterprise network for one or more vulnerabilities of the one or more cloud-based applications.

Figure 5:
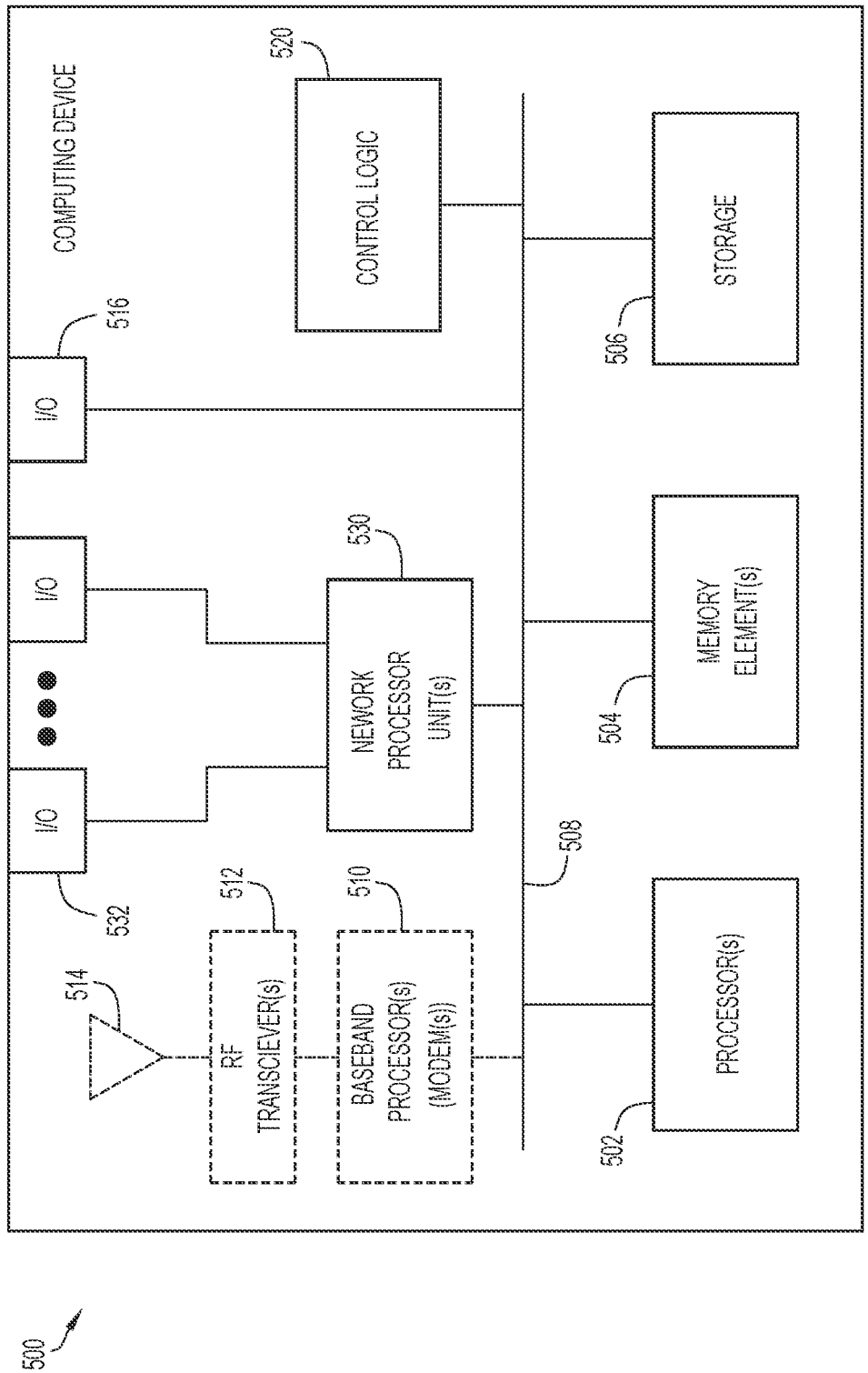
FIG. 5 is a hardware block diagram of a computing device that may perform functions associated with any combination of operations discussed in connection with techniques described for embodiments herein.

Referring to FIG. 5, FIG. 5 illustrates a hardware block diagram of a computing device 500 that may perform functions associated with operations discussed herein in connection with the techniques depicted via FIGURES as provided herein. In various embodiments, a computing device or apparatus, such as computing device 500 or any combination of computing devices 500, may be configured as any entity/entities as discussed for the techniques depicted in connection with operations illustrated/discussed for various embodiments herein, such as user device 112, authentication server 104, vulnerability policy server 106, security gateway 108, cloud application service 122, cloud-based application 126, vulnerability information source(s) 140, and/or any other elements/functions/nodes, discussed herein.

In at least one embodiment, the computing device 500 may be any apparatus that may include one or more processor(s) 502, one or more memory element(s) 504, storage 506, a bus 508, one or more network processor unit(s) 530 interconnected with one or more network input/output (I/O) interface(s) 532, one or more I/O interface(s) 516, and control logic 520. In various embodiments, instructions associated with logic for computing device 500 can overlap in any manner and are not limited to the specific allocation of instructions and/or operations described herein.

For embodiments in which computing device 500 may be implemented as any device capable of wireless communications (e.g., a wireless user device), computing device 500 may further include at least one baseband processor or modem 510, one or more radio RF transceiver(s) 512 (e.g., any combination of RF receiver(s) and RF transmitter(s)), one or more antenna(s) or antenna array(s) 514.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 530 may enable communication between computing device 500 and other systems, entities, etc., via network I/O interface(s) 532 (wired and/or wireless) to facilitate operations discussed for various embodiments described herein. In various embodiments, network processor unit(s) 530 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 532 can be configured as one or more Ethernet port(s), Fibre Channel ports, any other I/O port(s), and/or antenna(s)/antenna array(s) now known or hereafter developed. Thus, the network processor unit(s) 530 and/or network I/O interface(s) 532 may include suitable interfaces for receiving, transmitting, and/or otherwise communicating data and/or information (wired and/or wirelessly) in a network environment.

I/O interface(s) 516 may allow for input and output of data and/or information with other entities that may be connected to computing device 500. For example, I/O interface(s) 516 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 500 is implemented as a wireless device or any apparatus capable of wireless communications, the RF transceiver(s) 512 may perform RF transmission and RF reception of wireless signals via antenna(s)/antenna array(s) 514, and the baseband processor or modem 510 performs baseband modulation and demodulation, etc. associated with such signals to enable wireless communications for computing device 500.

In various embodiments, control logic 520, can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, from a cloud network of a cloud-based application, an authentication request associated with an enterprise user of an enterprise network that is seeking to utilize the cloud-based application, wherein the authentication request comprises an application identifier and a vulnerability index associated with the cloud-based application; identifying one or more vulnerabilities of the cloud-based application based on the application identifier and the vulnerability index; determining an access level for which the cloud-based application is allowed to access the enterprise network based, at least in part, on one or more vulnerabilities of the cloud-based application and one or more access rules associated with the cloud-based application; and sending an authentication response to the cloud network indicating the access level for which the cloud-based application is allowed to access the enterprise network.

In one instance, the application identifier is specific to the enterprise and is assigned to the cloud-based application by the cloud network. In one instance, the obtaining and the sending are performed by an authentication server of the enterprise network and the identifying and determining are performed by a vulnerability policy server of the enterprise network. In one instance, the authentication server and the vulnerability policy are one network element of the enterprise network.

In one instance, the method may include providing a handling policy to the cloud network indicating that the enterprise network is to perform an authentication to determine the access level for the cloud-based application upon an enterprise user seeking to utilize the cloud-based application, wherein the obtaining is based on the handling policy.

In one instance, the vulnerability index is an encoded attribute string, and the identifying includes identifying, based on the application identifier and the encoded attribute string, the one or more vulnerabilities from vulnerability information for the cloud-based application stored by the enterprise network. In one instance, the vulnerability index is a vulnerability identifier, and the identifying includes: querying at least one of the cloud network or one or more vulnerability information sources using, at least in part, the vulnerability identifier and the application identifier; and obtaining the one or more vulnerabilities based on the query.

In one instance, the access level indicates one of: all data requests sent from the cloud-based application to the enterprise network are to be blocked from accessing enterprise data of the enterprise network; one or more types of requests sent from the cloud-based application are allowed to access enterprise data for the enterprise network; or all requests sent from the cloud-based application are allowed to access enterprise data for the enterprise network.

In one instance, the method further includes enforcing one or more function calls of the cloud-based application received by the enterprise network based on the access level. In one instance, the cloud-based application is a low code application.

In one form, a computer-implemented method is provided that may include providing, by an enterprise authentication server and/or a vulnerability policy server of an enterprise network, at least one vulnerability handling policy to a cloud application service of one or more cloud-based applications; and facilitating access level enforcement for the one or more cloud-based applications for accessing the enterprise network according to the at least one vulnerability handling policy in which the at least one vulnerability handling policy is at least one of: a Cloud-Only handling policy, a Coordinated-Static handling policy, or a Coordinated-Dynamic handling policy.

In one instance, the Cloud-Only handling policy indicates that the cloud application service has authority to determine and/or enforce an access level for accessing the enterprise network for one or more vulnerabilities of the one or more cloud-based applications. In one instance, the Coordinated-Static handling policy indicates that the cloud application service has authority to determine and/or enforce an access level for accessing the enterprise network for one or more vulnerabilities of the one or more cloud-based applications based on one or more parameters or access rules provided to the cloud application service by the enterprise network (e.g., the enterprise authentication server and/or the vulnerability policy server). In one instance, the Coordinated-Dynamic handling policy indicates that the enterprise network (e.g., the authentication server and the vulnerability policy server) have authority to determine and/or enforce an access level for accessing the enterprise network for one or more vulnerabilities of the one or more cloud-based applications.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, by an enterprise network, an authentication request from a cloud application service of a cloud-based application, wherein the authentication request is associated with an enterprise user of the enterprise network that is seeking to utilize the cloud-based application, and wherein the authentication request comprises an application identifier and a vulnerability index associated with the cloud-based application;
    identifying, by the enterprise network for the authentication request, one or more vulnerabilities of the cloud-based application using the application identifier and the vulnerability index included in the authentication request;
    determining, by the enterprise network for the authentication request, an access level for which the cloud-based application is allowed to access the enterprise network based on access rules configured for the enterprise network, wherein the access rules indicate the access level that is to be determined based, at least in part, on the one or more vulnerabilities identified for the cloud-based application; and
    sending, by the enterprise network, an authentication response to the cloud application service indicating the access level for which the cloud-based application is allowed to access the enterprise network.

2. The method of claim 1, wherein the application identifier is assigned to the cloud-based application by the cloud application service.

3. The method of claim 1, wherein the obtaining and the sending are performed by an authentication server of the enterprise network and the identifying and determining are performed by a vulnerability policy server of the enterprise network.

4. The method of claim 3, wherein the authentication server and the vulnerability policy server are one network element of the enterprise network.

5. The method of claim 1, further comprising:
    providing a handling policy to the cloud application service indicating that the enterprise network is to perform an authentication to determine the access level for the cloud-based application upon an enterprise user seeking to utilize the cloud-based application, wherein the obtaining is based on the handling policy.

6. The method of claim 1, wherein the vulnerability index is an encoded attribute string and the identifying includes identifying, based on the application identifier and the encoded attribute string, the one or more vulnerabilities from vulnerability information for the cloud-based application stored by the enterprise network.

7. The method of claim 1, wherein the vulnerability index is a vulnerability identifier, and the identifying includes:
    querying at least one of the cloud application service or one or more vulnerability information sources using, at least in part, the vulnerability identifier and the application identifier; and
    obtaining the one or more vulnerabilities based on the querying.

8. The method of claim 1, wherein the access level indicates one of:
    all data requests sent from the cloud-based application to the enterprise network are to be blocked from accessing enterprise data of the enterprise network;
    one or more types of requests sent from the cloud-based application are allowed to access enterprise data for the enterprise network; or
    all requests sent from the cloud-based application are allowed to access enterprise data for the enterprise network.

9. The method of claim 8, further comprising:
    enforcing one or more function calls of the cloud-based application received by the enterprise network based on the access level.

10. The method of claim 1, wherein the cloud-based application is a low code application.

11. One or more non-transitory computer readable storage media encoded with instructions that, when executed by a processor, cause the processor to perform operations, comprising:
    obtaining, by an enterprise network, an authentication request from a cloud application service of a cloud-based application, wherein the authentication request is associated with an enterprise user of the enterprise network that is seeking to utilize the cloud-based application, and wherein the authentication request comprises an application identifier and a vulnerability index associated with the cloud-based application;
    identifying, by the enterprise network for the authentication request, one or more vulnerabilities of the cloud-based application using the application identifier and the vulnerability index included in the authentication request;
    determining, by the enterprise network for the authentication request, an access level for which the cloud-based application is allowed to access the enterprise network based on access rules configured for the enterprise network, wherein the access rules indicate the access level that is to be determined based, at least in part, on the one or more vulnerabilities identified for the cloud-based application; and
    sending, by the enterprise network, an authentication response to the cloud application service indicating the access level for which the cloud-based application is allowed to access the enterprise network.

12. The media of claim 11, wherein the application identifier is assigned to the cloud-based application by the cloud application service.

13. The media of claim 11, wherein the instructions, when executed by the processor, cause the processor to perform further operations, comprising:
    providing a handling policy to the cloud cloud application service indicating that the enterprise network is to perform an authentication to determine the access level for the cloud-based application upon an enterprise user seeking to utilize the cloud-based application, wherein the obtaining is based on the handling policy.

14. The media of claim 11, wherein the vulnerability index is an encoded attribute string and the identifying includes identifying, based on the application identifier and the encoded attribute string, the one or more vulnerabilities from vulnerability information for the cloud-based application stored by the enterprise network.

15. The media of claim 11, wherein the vulnerability index is a vulnerability identifier, and the identifying includes:
    querying at least one of the cloud cloud application service or one or more vulnerability information sources using, at least in part, the vulnerability identifier and the application identifier; and
    obtaining the one or more vulnerabilities based on the querying.

16. A system comprising:
    at least one memory element for storing data; and
    at least one processor for executing instructions associated with the data, wherein executing the instructions causes the system to perform operations, comprising:
        obtaining, by an enterprise network, an authentication request from a cloud application service of a cloud-based application, wherein the authentication request is associated with an enterprise user of the enterprise network that is seeking to utilize the cloud-based application, and wherein the authentication request comprises an application identifier and a vulnerability index associated with the cloud-based application;
        identifying, by the enterprise network for the authentication request, one or more vulnerabilities of the cloud-based application using the application identifier and the vulnerability index included in the authentication request;
        determining, by the enterprise network for the authentication request, an access level for which the cloud-based application is allowed to access the enterprise network based on access rules configured for the enterprise network, wherein the access rules indicate the access level that is to be determined based, at least in part, on the one or more vulnerabilities identified for the cloud-based application; and
        sending, by the enterprise network, an authentication response to the cloud application service indicating the access level for which the cloud-based application is allowed to access the enterprise network.

17. The system of claim 16, wherein the application identifier is assigned to the cloud-based application by the cloud application service.

18. The system of claim 16, wherein the instructions, when executed by the processor, cause the processor to perform further operations, comprising:
    providing a handling policy to the cloud application service indicating that the enterprise network is to perform an authentication to determine the access level for the cloud-based application upon an enterprise user seeking to utilize the cloud-based application, wherein the obtaining is based on the handling policy.

19. The system of claim 16, wherein the vulnerability index is an encoded attribute string and the identifying includes identifying, based on the application identifier and the encoded attribute string, the one or more vulnerabilities from vulnerability information for the cloud-based application stored by the enterprise network.

20. The system of claim 16, wherein the vulnerability index is a vulnerability identifier, and the identifying includes:
- querying at least one of the cloud application service or one or more vulnerability information sources using, at least in part, the vulnerability identifier and the application identifier; and
- obtaining the one or more vulnerabilities based on the querying.

* * * * *